United States Patent

Aoki

[11] Patent Number: 5,606,386
[45] Date of Patent: Feb. 25, 1997

[54] CAMERA VIEWFINDER WITH FRAMING PLATE ILLUMINATION

[75] Inventor: Hitoshi Aoki, Tokyo, Japan

[73] Assignee: Nikon Corporation, Tokyo, Japan

[21] Appl. No.: 346,224

[22] Filed: Nov. 22, 1994

[30] Foreign Application Priority Data

Dec. 2, 1993 [JP] Japan .................................. 5-302706

[51] Int. Cl.⁶ .................................................. G03B 13/02
[52] U.S. Cl. .................................................. 396/373
[58] Field of Search ........................... 354/409, 155, 354/166, 199, 200, 201, 219, 221, 222, 224, 225

[56] References Cited

U.S. PATENT DOCUMENTS 4,560,264  12/1985  Kitazawa et al. ................... 354/219
5,170,204  12/1992  Mukai et al. ....................... 354/409
5,404,193   4/1995  Harada ............................... 354/409

Primary Examiner—Howard B. Blankenship
Attorney, Agent, or Firm—Oliff & Berridge

[57] ABSTRACT

A camera viewfinder illuminates a field of vision framing plate with light from at least one internal light source. The light from the at least one internal light source reflects off semi-transparent surfaces of a light transmissive component onto the field of vision framing plate. Additionally, a light collection window directs external light to the semi-transparent surfaces. The semitransparent surfaces pass the external light to the field of the vision framing plate. The intensity of light from the at least one internal light source can be varied based on a measured intensity of the external light to maintain a desired intensity of light on the field of vision framing plate.

20 Claims, 5 Drawing Sheets

CAMERA VIEWFINDER WITH FRAMING PLATE ILLUMINATION

BACKGROUND OF THE INVENTION

1. Field of the Invention

The present invention relates to a camera viewfinder that superimposes an image of an object being photographed with a field of vision frame so as to display boundaries used during photography relative to the image.

2. Description of Related Art

Bright frame viewfinders are known that bring in external light from a light collection window located on an outer surface of the camera and brightly illuminate a field of vision frame, indicating the photographic boundaries of the object being photographed. Since the external light taken in through the light collection window by these bright frame viewfinders at night or in dark places is reduced, the field of vision frame becomes difficult to see.

Therefore, in convention camera viewfinders, an external light source is attached near the light collection window. Such camera viewfinders use these external light sources to illuminate the field of vision frame.

However, with the conventional type of viewfinder, when the object being photographed is in bright conditions, such as in bright daylight conditions, the field of vision frame of the viewfinder can become too bright and disappear completely. Accordingly, sometimes while it is difficult to view the field of vision frame, the composition of the object being photographed cannot be set properly due to the intense light.

In addition, since the indicated field of vision frame (frame) is difficult to distinguish when it is complex, only a comparatively simple field of vision frame may be displayed.

It is conceivable that liquid crystal elements (i.e., a liquid crystal display (LCD)) could be used to display a complex field of vision frame in order to resolve the latter problem. However, since the permeability of liquid crystal elements is low, the field of vision frame can become hard to see.

For additional background information, see U.S. Pat. No. 5,170,204, the disclosure of which is incorporated herein by reference. U.S. Pat. No. 5,170,204 discloses a camera in which a first LCD, through which the photographic image passes, is used to superimpose one or more frames on the photographic image, while a second LCD is used in combination with a light source to project a display of photographic data to a border portion of the photographic image in the viewfinder.

SUMMARY OF THE INVENTION

It is an object of the present invention to solve the above and other problems by providing a camera viewfinder in which the field of vision framing plate is illuminated so that it can be observed by a photographer through a viewfinder and can be clearly discerned under any type of photographic condition.

In order to realize this and other objects and to overcome the shortcomings set forth above, embodiments of the present invention provide a viewfinder for a camera that includes at least one light source (for example, one or more LEDs or neon lamp flash devices) internal to the camera. A light transmissive component having semitransparent surfaces reflects light from the at least one light source onto a field of vision framing plate so as to illuminate the field of vision frame.

Preferably, the field of vision framing plate also is illuminated with external light obtained through a light collection window located on an external surface of the camera. The light collection window directs external light to the light transmissive component, which passes the external light therethrough to further illuminate the field of vision framing plate. An image of the object being photographed that is superimposed with the field of vision frame in the viewfinder is viewed through an eyepiece of the camera by a photographer.

Preferably, the light transmissive component is provided between the light collection window and the field of vision framing plate. External light from the light collection window is directed to (and passes through) the light transmissive component. Semi-transparent surfaces are formed in the light transmissive component. The semi-transparent surfaces reflect light supplied by the internal light sources, and pass external light from the light collection window to illuminate the field vision frame on the field of vision framing plate. Thus, preferably, the above-mentioned objective is accomplished by illuminating the field of vision framing plate with both permeated light from the light collection window and reflected light from the at least one internal light source.

The light transmissive component includes wedge-shaped concave portions that form the semi-transparent surfaces, which reflect light from the internal light source and pass the external light to the field of vision framing plate.

According to one aspect of the present invention, the light transmissive component includes a connecting portion that passes light from the at least one internal light source to the field of vision framing plate without reflecting the light.

According to another aspect of the invention, two semi-transparent surfaces and two internal light sources are positioned on opposite sides of the field of vision framing plate.

Preferably, the camera viewfinder also includes a display component located on the field of vision frame of the field of vision framing plate. The display component displays various camera information.

The field of vision framing plate may be constructed from a light permeable, negative-type liquid crystal element.

According to another aspect of the present invention, the intensity of light from the at least one light source internal to the camera is varied according to an intensity output of a light measuring element that detects the brightness of the external light. Thus, even if an intensity of the external light is low, the field of vision frame is sufficiently illuminated to a desired level so that it can be clearly discerned even if a complex field of vision frame is displayed or the intensity of the external light becomes low.

BRIEF DESCRIPTION OF THE DRAWINGS

The invention will be described in detail in conjunction with the following drawings in which like reference numerals designate like elements and wherein.

DETAILED DESCRIPTION OF PREFERRED EMBODIMENTS

Figure 1A:
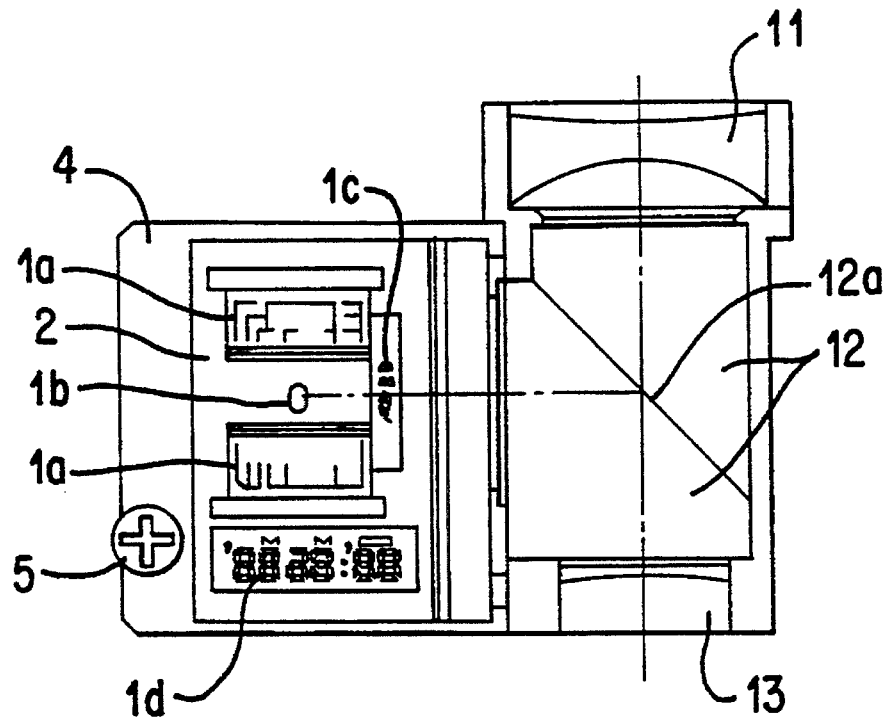
FIGs. 1(a) and 1(b) illustrate the construction of a viewfinder in accordance with an embodiment of the present invention.
Figure 1B:
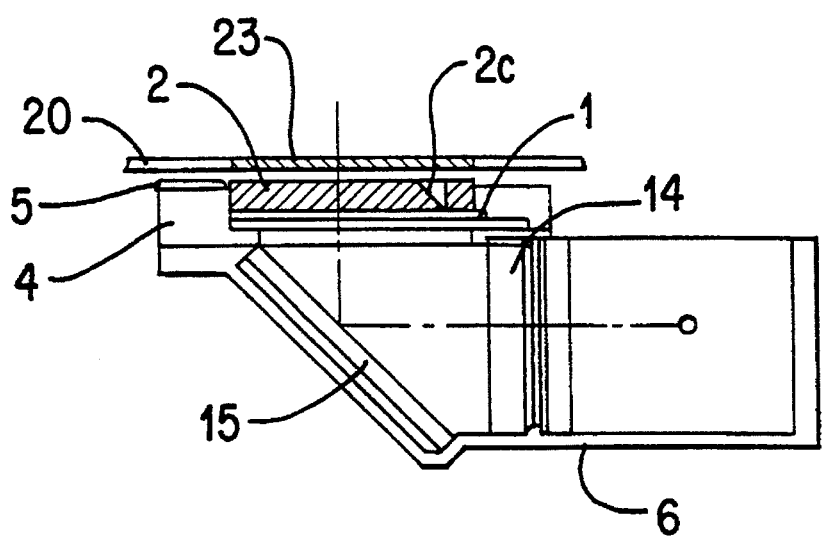
Figure 2A:
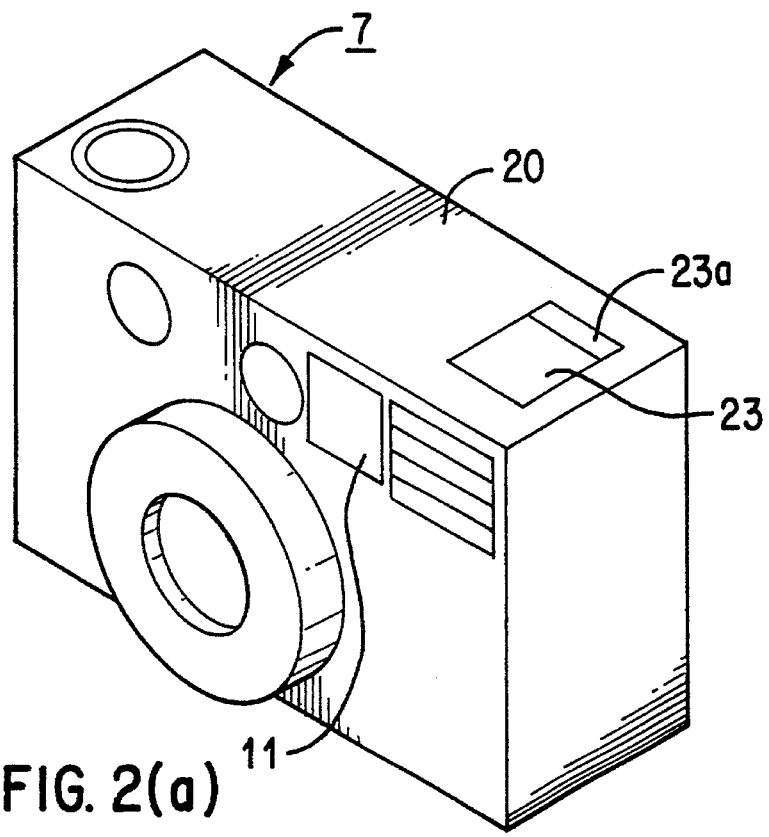
FIGS. 2(a) and 2(b) illustrate front and rear oblique views of a camera equipped with the viewfinder of FIGs. 1(a) and 1(b)
Figure 2B:
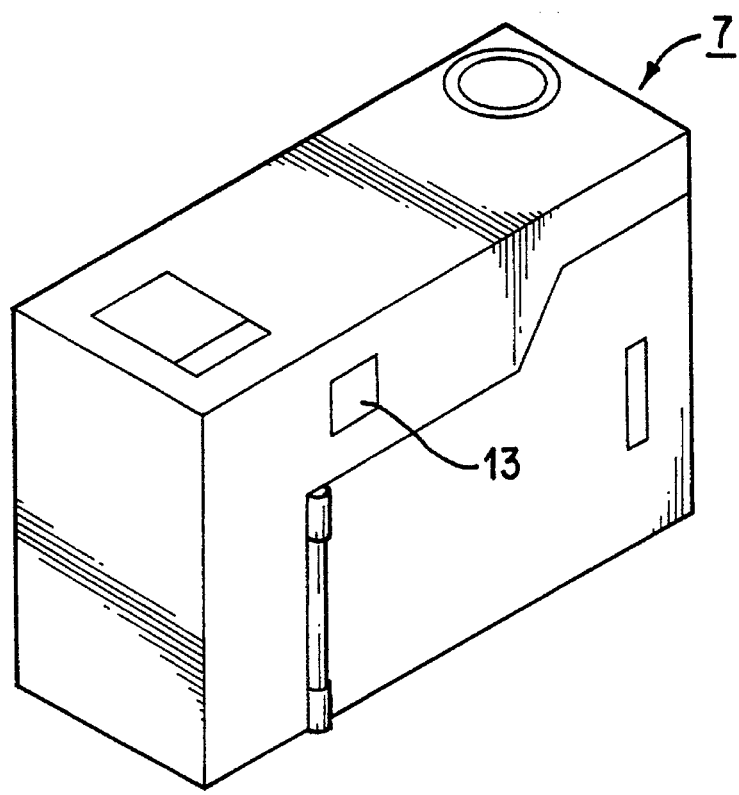

FIGS. 1(a) and 1(b) illustrate a viewfinder in accordance with an embodiment of the present invention. In FIGS. 1(a) and 1(b), a negative-type (light transmissive) liquid crystal display is used as the field of vision framing plate 1. Field of vision frame components 1a–1c are provided, along with an external display component 1d on the field of vision framing plate 1. The field of vision frame components 1a–1c include a field of vision frame 1a that corrects for parallax and related problems. Also provided is a target mark 1b (referred to hereafter as an "AF mark"), which is used in auto-focusing (i.e., to identify the area of the photographic image to be used for auto-focusing), and an information display component 1c that displays the state of the shutter speed, strobe, and the like. A light transmissive component 2 allows for light to pass therethrough for illumination of the field of vision framing plate 1, and is arranged between a light collection window 23 (shown in FIGS. 2(a), 2(b)) at the top surface 20 of the camera 7 and the field of vision framing plate 1. External light that is brought in by the light collection window 23 passes through the light transmissive component 2 and the negative-type field of vision components 1a–1c, namely segmented portions comprising the frame 1a, the AF mark 1b, and the information display component 1c. The transmitted external light is reflected by a mirror 15, and passes through a lens 14, is reflected by the beam splitting portion 12a of a prism 12, and superimposes with the image of the object being photographed, which has passed through an object lens 11 and is conducted to the eye of the photographer through the eyepiece 13.

Figure 3:
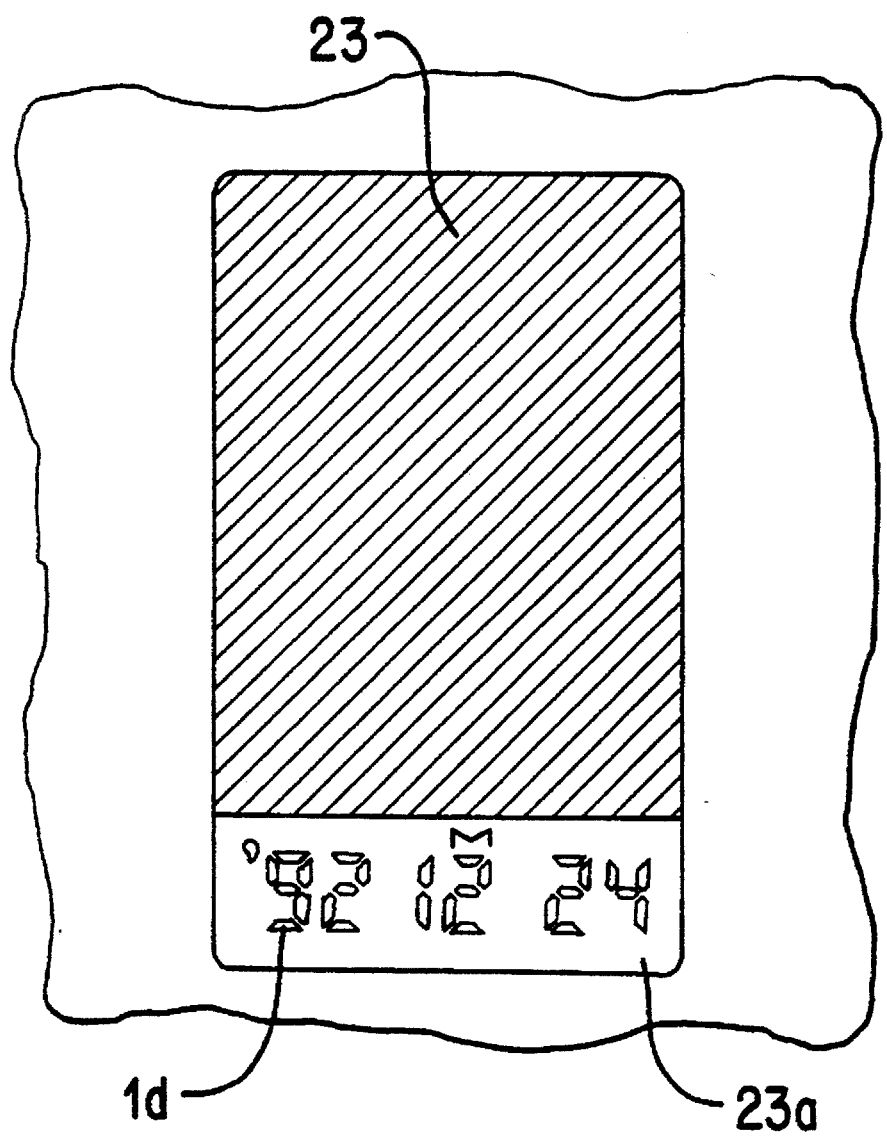
FIG. 3 is an enlarged view of the light collection window and date display component of the camera of FIGs. 1(a) and 1(b)

As shown in FIG. 3, the external display component 1d of the field of vision framing plate I typically displays the date and time of photography and the like on the date display component 23a on the top surface 20 of the camera. The external display component may display other information as well. The external display component 1d may be constructed from a positive-type (opaque) liquid crystal display. A reflective plate (not shown) is attached to the rear surface of the camera, which typically shows the date, time, and the like in black symbols and numbers. As shown in FIG. 1(b), the field of vision framing plate 1 is attached to an adjustment component 4, which is attached to a finder block 6 by a screw 5.

Figure 4A:
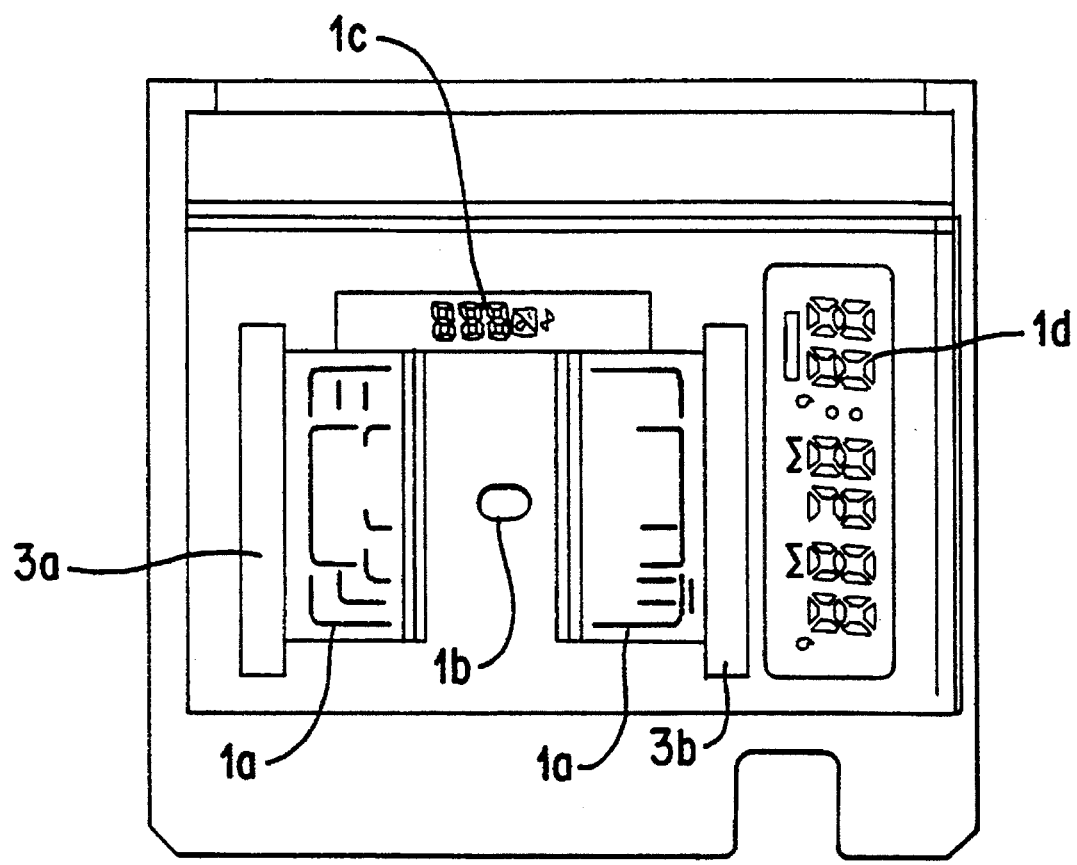
FIGS. 4(a) and 4(b) illustrate the construction of a light transmissive component and field of vision framing plate in accordance with an embodiment of the present invention.
Figure 4B:
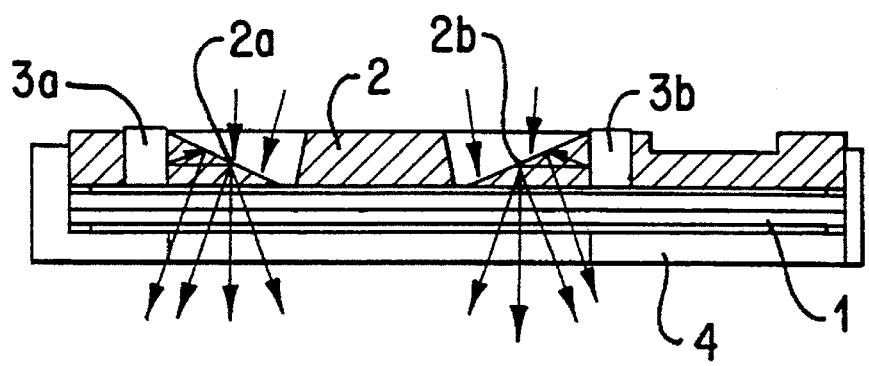

FIG. 4(a) is a plan view of the light transmissive component 2 and the field of vision framing plate 1. FIG. 4(b) shows a cross section of the components shown in FIG. 4(a).

As shown in FIG. 4(b), wedge-shaped semi-transparent surfaces 2a and 2b are formed in the light transmissive component 2. The semitransparent surfaces are positioned above the field of vision framing plate 1, in particular above the frame 1a and the AF mark 1b of the field of vision framing plate 1. Internal light sources 3a and 3b are positioned along these semi-transparent surfaces 2a and 2b and are used to illuminate the field of vision framing plate 1. The internal light sources 3a and 3b may be constructed from two chip LEDs or from neon lamp flash devices. The intensity of light directed to the field of vision framing plate by the internal light sources preferably is adjusted in accordance with the intensity of the external light detected by a light measuring element 100 (which can be, for example, a well known photometry circuit typically provided on many cameras) so as to maintain the total intensity of light directed to the field of vision framing plate at a desired level when the intensity of the external light is low. The light cast by internal light sources 3a and 3b is both reflected and diffused by the semi-transparent surfaces 2a and 2b, illuminating the field of vision framing plate 1 below. The external light brought in by the light collection window 23 is also conducted through the semi-transparent surfaces 2a and 2b, further illuminating the field of vision framing plate 1.

A wedge-shaped semi-transparent surface 2c is also formed on the light transmissive component 2 above the information display component 1c, as shown in FIG. 1(b), in order to illuminate the information display component 1c of the field of vision framing plate 1. There is no distinct illuminating light source provided for the information display component 1c; however, the light from internal light sources 3a and 3b circulates in, and is reflected by the semi-transparent surface 2c, diffuses, and illuminates the information display component 1c.

Figure 5A:
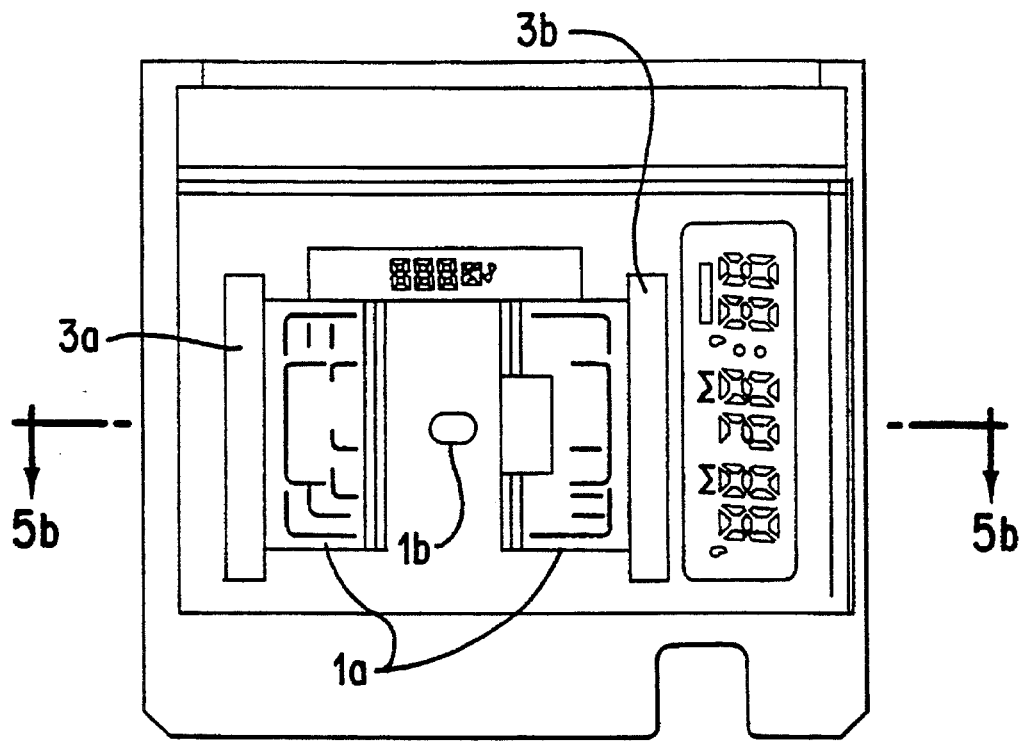
FIGS. 5(a), 5(b) and 5(c) illustrate the construction of a light transmissive component and field of vision framing plate in accordance with another embodiment of the present invention.
Figure 5B:
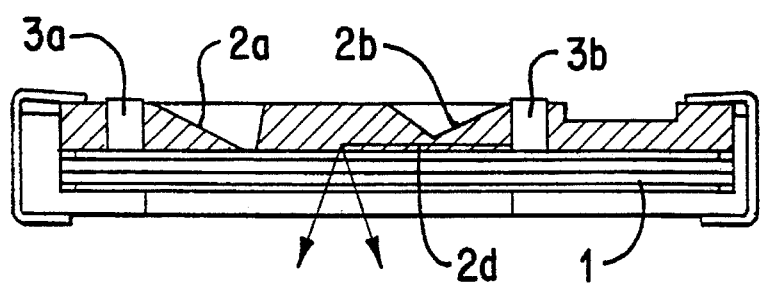
Figure 5C:
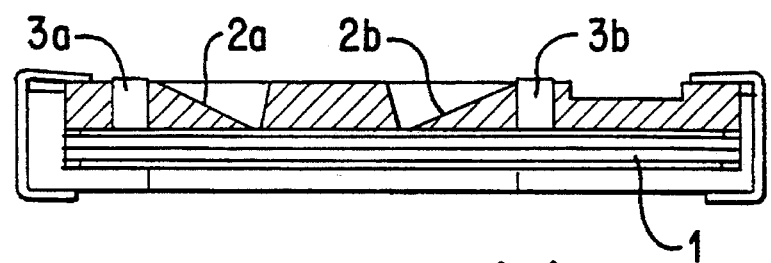

FIG. 5(a) is a plan view of another light transmissive component 2 and the field of vision framing plate 1. FIG. 5(b) is a cross section through the line 5b—5b, which passes through the AF mark 1b of FIG. 5(a). FIG. 5(c) is a cross section of the components that does not pass through the AF mark 1b.

A central portion of the wedge-shaped concave component that forms the semi-transparent surface 2b on the light transmissive component 2, as shown in FIG. 5(b), does not extend to the bottom of the light transmissive component 2. The light transmissive component 2 includes a connecting portion 2d. The light emitted from the internal light source 3b passes through the connecting portion 2d without being reflected, reaches the central portion of the field of vision framing plate 1, and illuminates the AF mark at the center of the field of vision framing plate I (via diffusion by light transmissive component 2).

A positive-type liquid crystal device may be used in the embodiment described above for the external display component 1d; however, if internal light is not provided to the external display component 1d, a negative-type display can be used.

The light collection window 23 and the light transmissive component 2 were formed as separate components with the embodiment described above; however, the light collection window 23 and light transmissive component 2 may also be formed as a single component.

According to the present invention described above, a light transmissive component is provided in between at least one internal light source and the field of vision framing plate. Light from the at least one internal light source reflects from semi-transparent surfaces formed in the light transmissive component to illuminate the field of vision framing plate, particularly the portions of the field of vision framing plate that are to be superimposed with the photographic image. Additionally, external light from a light collection window passes through the field of vision framing plate to further illuminate the field of vision framing plate. Thus, a field of vision frame of the field of vision framing plate can be clearly discerned by a photographer, even when the external light is dim or when a complex field of vision frame is displayed.

Wedge-shaped concave portions may be provided on the light transmissive component, forming semi-transparent surfaces. In this case, the manufacture of the light transmissive component is facilitated. A light transmissive (permeable) connecting portion of the wedge-shaped concave portions may also be included that allows light from one or more of the internal light sources to be transmitted onto a central portion of the field of vision framing plate without reflecting from the semi-transparent portions. In this manner the central portion of the field of vision framing plate may be adequately illuminated.

Semi-transparent surfaces may also be formed above specific portions of the field of vision frame on the field of vision framing plate. In this manner the vital parts of the field of vision frame are adequately illuminated.

Semi-transparent surfaces may also be positioned on opposite sides of the field of vision frame of the field of vision framing plate, thus efficiently illuminating the field of vision frame plate.

The intensity of light from the internal light sources may be varied in accordance with an intensity of the external light measured by a light measuring element. In this manner, the field of vision frame may be illuminated with a desired degree of intensity, regardless of external lighting conditions.

While this invention has been described in conjunction with specific embodiments thereof, it is evident that many alternatives, modifications and variations will be apparent to those skilled in the art. Accordingly, the preferred embodiments of the invention as set forth herein are intended to be illustrative, not limiting. Various changes may be made without departing from the spirit and scope of the invention as defined in the following claims.

What is claimed is:

1. A viewfinder for a camera comprising:
   a field of vision framing plate including frame components that are to be superimposed with an image of an object being photographed;
   at least one light source internal to the camera; and
   a light transmissive component disposed adjacent to the field of vision framing plate, the light transmissive component having at least one semitransparent surface that reflects light from the at least one light source, thereby illuminating the field of vision framing plate;
   wherein the light transmissive component includes a connecting portion, the connecting portion passing light from the at least one light source to the field of vision framing plate without reflecting the light from the at least one light source.

2. The viewfinder according to claim 1, further comprising a light collection window located on an external surface of the camera, said light collection window directing external light to the light transmissive component, the at least one semi-transparent surface passing the external light to further illuminate the field of vision framing plate.

3. The viewfinder according to claim 1, wherein the frame components include a field of vision frame and the light from the at least one light source illuminates the field of vision frame.

4. The viewfinder according to claim 1, wherein the at least one semitransparent surface includes wedge-shaped concave portions of the light transmissive component.

5. The viewfinder according to claim 1, wherein the at least one semitransparent surface is formed adjacent to a field of vision frame of the field of vision framing plate.

6. The viewfinder according to claim 1, wherein the at least one light source comprises two light sources, and wherein two of said semi-transparent surfaces are provided, the two light sources and the two semi-transparent surfaces both being positioned on opposite sides of a field of vision frame of the field of vision framing plate.

7. The viewfinder according to claim 6, wherein the opposite sides of the field of vision frame comprise right and left sides of the field of vision frame.

8. The viewfinder according to claim 1, further comprising a display component located on a field of vision frame of the field of vision framing plate, said display component displaying camera information.

9. The viewfinder according to claims 6, further comprising a display component extending between the opposite sides of the field of vision frame, said display component displaying camera information, wherein the light transmissive component includes wedge-shaped concave portions located at least above the display component, the wedge-shaped concave portions forming the semitransparent surfaces.

10. The viewfinder according to claim 1, wherein the at least one light source comprise at least one LED.

11. The viewfinder according to claim 1, wherein the at least one light source comprise at least one neon lamp flash device.

12. The viewfinder according to claim 1, wherein the field of vision framing plate comprises a light transmissive, negative-type liquid crystal display.

13. The viewfinder according to claim 2, further comprising a light measuring element that detects an intensity of the external light, wherein an intensity of the at least one light source varies based upon the detected intensity of the external light so as to maintain a desired intensity of light at the field of vision framing plate.

14. A viewfinder for a camera, comprising:
   field of vision framing means for superimposing frame components with an image of an object being photographed;
   light receiving means for receiving external light from outside of said camera;
   light emitting means for emitting light internal to the camera; and
   light transmissive means for transmitting light from said light receiving means and for reflecting light from said light emitting means to illuminate the field of vision framing means; wherein
   the light transmissive means includes connecting means, the connecting means passing light from the light emitting means to the field of vision framing means without reflecting the light from the light emitting means.

15. The viewfinder according to claim 14, wherein said light transmissive means includes semi-transparent surfaces that pass the external light to illuminate the field of vision framing means, said semi-transparent surfaces also reflecting the light from said light emitting means.

16. The viewfinder according to claim 14, further comprising display means located on the field of vision framing means for displaying camera information.

17. The viewfinder according to claim 14, further comprising:
   light measuring means for detecting an intensity of the external light; and
   means for varying an intensity of the light emitted by said light emitting means based upon the detected intensity of the external light so as to maintain a desired intensity of light at the field of vision framing means.

18. A method of providing light to a field of vision framing plate of a viewfinder of a camera, comprising the steps of:

collecting external light from outside of the camera;

emitting light from at least one light source internal to the camera;

directing the collected light and the light from the at least one light source to a light transmissive component disposed adjacent to the field of vision framing plate, the light transmissive component having semitransparent surfaces that transmit the collected light and that also reflect the light from the at least one light source to thereby illuminate the field of vision framing plate and a connecting portion that passes light from the at least one light source to the field of vision framing plate without reflecting the light from the at least one light source.

19. The method of claim 18, wherein the light from the light source and the collected external light illuminate a field of vision frame on the field of vision framing plate.

20. The method of claim 18, further comprising the steps of:

detecting an intensity of the external light; and varying an intensity of the at least one light source based upon the detected intensity of the external light so as to maintain a desired intensity of light at the field of vision framing plate.

* * * * *